United States Patent [19]

Matsubara et al.

[11] 3,903,152

[45] Sept. 2, 1975

[54] PROCESS FOR PRODUCING HIGHLY PURE 1,12-DODECANEDIOIC ACID

[75] Inventors: Takashi Matsubara; Yushi Ishibashi; Yoshihiko Okada, all of Nagoya, Japan

[73] Assignee: Toagosei Chemical Industry Co., Ltd., Tokyo, Japan

[22] Filed: June 29, 1973

[21] Appl. No.: 375,196

[30] Foreign Application Priority Data
July 4, 1972 Japan.............................. 47-66372
Nov. 24, 1972 Japan............................ 47-117123

[52] U.S. Cl. ............................................. 260/537 P
[51] Int. Cl.² ....................................... C07C 51/42
[58] Field of Search ................... 260/537 P, 531 R

[56] References Cited
UNITED STATES PATENTS

| | | |
|---|---|---|
| 2,436,269 | 2/1948 | Scott .............................. 260/537 P |
| 2,962,527 | 11/1960 | Chafetz et al. ................... 260/537 P |
| 3,070,626 | 12/1962 | Convery .......................... 260/537 P |
| 3,087,963 | 4/1963 | Wiese et al. ...................... 260/537 P |
| 3,219,675 | 11/1965 | Seekircher ....................... 260/537 P |
| 3,637,832 | 1/1972 | White et al. ..................... 260/537 P |

*Primary Examiner*—Vivian Garner
*Attorney, Agent, or Firm*—Sughrue, Rothwell, Mion, Zinn and Macpeak

[57] ABSTRACT

A process for purifying 1,12-dodecanedioic acid by heat-treating 1,12-dodecanedioic acid with an aqueous solution containing acid sulfite ion or sulfite ion is disclosed, said 1,12-dodecanedioic acid being prepared by oxidizing cyclododecanol and/or cyclododecanone with nitric acid.

13 Claims, No Drawings

PROCESS FOR PRODUCING HIGHLY PURE 1,12-DODECANEDIOIC ACID

BACKGROUND OF THE INVENTION

Field of the Invention

The present invention relates to a process for producing highly pure 1,12-dodecanedioic acid and, more particularly, it relates to a process for obtaining highly pure 1,12-dodecanedioic acid (hereinafter abbreviated as DDA) having high heat stability in high yield with ease and with economic advantage by purifying crude DDA obtained by oxidizing cyclododecanol and/or cyclododecanone with nitric acid.

2. Description of the Prior Art

DDA is an extremely useful material for industrial use and is used as a starting material for synthetic polymers such as polyamides, polyesters, etc. or for a plasticizer. Upon using it, there is required a product with high purity and good heat stability.

However, DDA obtained by oxidizing cyclododecanol and/or cyclododecanone with nitric acid contains by-produced dibasic acid having not more than 11 carbon atoms and nitrogen-containing impurities. It has been extremely difficult to obtain in high yield DDA with high purity showing good alkali color and having excellent heat stability.

For example, crude DDA crystal produced by conducting the oxidation reaction at 70° – 95°C using 60% nitric acid in the presence of a copper ammonium metavanadate catalyst followed by filtrating at 70°C contains 300 – 1500 ppm (calculated as $N_2$) of nitro compound, nitroso compound, nitrous ester or like nitrogen-containing compound and 2 – 3% of dibasic acids having not more than 11 carbon atoms. When this crystal is dissolved in alkali, the solution appears yellow (optical density: not less than 2). In addition, the crystal is heavily colored by heating and, for example, Hazen color number (APHA) determined by a heat stability test conducted in the air at 150°C for 2 hours is not less than 1000.

These impurities and coloration can rarely be removed by washing crude DDA with water.

As a process for purifying such crude DDA, there has been suggested a process of recrystallization using an organic solvent such as toluene, ethyl alcohol, polyethylene glycol, dialkyl ether, acetone, acetic acid or the like. However, this process cannot be employed as an industrial process taking into consideration the increase in cost due to the use of a solvent, loss of DDA into the solvent, necessity of the recovery of the solvent and the necessity of repeating recrystallization in several times in order to obtain highly pure DDA through mere recrystallization as is described in the following instance.

For example, it is described in West German OLS No. 1,443,811 that, when crude DDA containing 1400 ppm of nitrogenous component is recrystallized from ethyl acetate, the nitrogenous content is reduced to 210 ppm, which content is fruther reduced to 150 ppm by second recrystallization from ethyl acetate. This shows that it is difficult to purify crude DDA by mere recrystallization from an organic solvent.

On the other hand, according to French Pat. No. 1,392,568, crude DDA is treated with a boiling water to separate lower dibasic acids. However, the separation ratio is not necessarily satisfactory. In addition to these processes, there have been suggested a process of recrystallizing from hot water under pressure. However, none of the above processes are effective for removing nitrogen-containing impurities, separating lower dibasic acids and obtaining DDA having excellent heat stability.

Furthermore, according to Swiss Pat. Application No. 1415/68 (Japanese Pat. Publication No. 13887/72), highly pure DDA is obtained by treating DDA with an alkali aqueous solution. However, this process is not preferable since the heat stability and the coloration in alkalis of the thus purified DDA are not excellent.

SUMMARY OF THE INVENTION

As a result of extensive investigations on the process for purifying crude DDA so as to remove these defects encountered in the conventional processes and to obtain DDA of high quality at good yield, the inventors have found the fact that DDA having excellent heat stability and having less nitrogen content, in particular, DDA which permits the production of polymers having light colors and a high degree of polymerization when it is used for polyamide synthesis, can be obtained in high yield by heat-treating crude DDA in the presence of an aqueous solution containing an acid sulfite or sulfite ion (hereinafter referred to merely as "sulfite ion"), separating the resulting crystal and, if necessary, conducting hot water-treatment at about 80°C, dehydration and drying. The present invention has been completed based on this discovery.

DETAILED DESCRIPTION OF THE INVENTION

As the acid sulfite ion sources to be used in the invention, there are preferably used alkali salts and ammonia salts such as sodium acid sulfite, potassium acid sulfite, lithium acid sulfite, ammonium acid sulfite, and the like.

As the sulfite ion sources, an aqueous solution containing dissolved therein sulfurous acid gas or any water-soluble sulfite may be used. In particular, sodium sulfite, potassium sulfite, ammonium sulfite, etc. are preferable. If the amount of the sulfite ion to be used is too small, there is obtained no effect while, if too much is used, DDA losses tend to increase.

Where the starting DDA to be purified contains a large amount of nitric acid and the like, it is also possible to add a neutral salt and substantially produce acid salt in situ under treatment conditions. The preferable amount of sulfite ion to be used is about 0.005 to 0.2 mole per 1 mole of crude DDA. Also, the concentration of sulfite ion is preferably 0.5 to 5% by weight. If the concentration is too low, large volume apparatus is required while, if the concentration is too high, the fluidity of the DDA crystal tends to become unfavorable.

The heat treatment is conducted at a temperature of at least 80°C, preferably above 90°C, more preferably, under a boiling condition, by suspending DDA in an aqueous solution of a treating agent for a period of at least 30 minutes, preferably from 2 to 6 hours.

The DDA crystal treated with this sulfite ion-containing aqueous solution can be separated by filtration or centrifugation. The thus separated DDA crystal is then treated as such or, more preferably, after washing with a ½ to 5-fold amount of water, with hot water of not less than 80°C for longer than 30 minutes. This hot water-treatment can be conducted under mechanical stirring or in a boiling state using a vessel for a batchwise operation or for a continuous operation. The amount of water to be used for the hot water-treatment is about 1 to 20 times, preferably about 2 to 10 times, that of DDA. The period of the hot water-treatment is preferably longer than 30 minutes and, particularly preferably, around 120 minutes.

After the hot-water treatment, the crystals are filtered out and, if necessary, washed with water and dried.

The present invention will now be illustrated more specifically by reference to the following examples.

Reference Example 25.1 Grams of copper dust and 8.4g of ammonium metavanadate were dissolved in 16.9 kg of 60% nitric acid and supplied to a 20-liter reactor made of stainless steel and equipped with a stirrer. Thereafter, 2.00 kg of a molten mixture of cyclododecanol and cyclododecanone (85%:15%) was supplied to the reactor in 120 minutes while maintaining the reaction temperature at 70°C. After the completion of supply, the temperature of the mixture was raised and maintained at 85°C for 40 minutes then at 95°C for 40 minutes. Thereafter, the mixture was cooled to 70°C, and the crystal was filtrated out followed by washing with water. After wetting the crystal with 10 liters of water, centrifugation was conducted to obtain 2.08 g of crude DDA. The thus obtained crystal was butyl-esterified. Analysis of the product by gas chromatography showed that the yield based on the starting material was 84%. Also, the contents of dibasic acids having 11 and 10 carbon atoms contained in the crude DDA were 2.2% and 0.4%, respectively.

Nitrogen analysis by Kjeldahl method after drying the crude DDA in a draft dryer at 80°C for 8 hours showed that the nitrogen content thereof was 514 ppm. Hazen color number (APHA) in the heat stability test was more than 1000.

EXAMPLE 1

100 Grams of the crude DDA obtained in Reference Example 1 was added to 450 g of a 1% sodium acid sulfite aqueous solution and maintained for 90 minutes under boiling. After separating the crystals, the crystals were washed with 300 g of water and heat-treated in 300 g of water at 100°C for 60 minutes, followed by separating the crystal at the same temperature. This crystal was draft-dried at 80°C for 8 hours. The quality and yield of the purified crystal are shown in Table 1.

Also, there is shown in Table 1 the quality of dioctyl dodecanedioate (hereinafter abbreviated as DOD) obtained by adding 150 g of 2-ethylhexanol and 0.1 g of tetrabutyl titanate to 50 g of the purified DDA, conducting esterification reaction at 180° to 200°C for 4 to 5 hours and removing excess amount of 2-ethylhexanol.

EXAMPLE 2

Purification of DDA and synthesis of DOD were conducted under the same conditions using the same starting material as in Example 1 except for using potassium acid sulfite in place of sodium acid sulfite. The results obtained are shown in Table 1.

EXAMPLE 3

Purification of DDA and synthesis of DOD were conducted under the same conditions using the same starting material as in Example 1 except for using ammonium acid sulfite in place of sodium acid sulfite. The results obtained are shown in Table 1.

COMPARATIVE EXAMPLE 1

Purification of DDA and synthesis of DOD were conducted under the same conditions using the same starting material as in Example 1 except for conducting mere hot water-treatment using water in place of the aqueous solution of sodium acid sulfite. The results obtained are shown in Table 1.

COMPARATIVE EXAMPLE 2

Procedures described in Example 1 were conducted except for using a 1% caustic soda in place of a 1% sodium acid sulfite aqueous solution. The results are shown in Table 1.

Table 1

| | Nitrogen content (ppm) | Quality of DDA | | | Color* (APHA) | DOD Acid value (mgKOH/g) | Yield of purified DDA (%) |
|---|---|---|---|---|---|---|---|
| | | Heat stability* (APHA) | Content of dibasic acid having 11 carbon atoms (% by wt.) | Content of dibasic acid having 10 carbon atoms (% by wt.) | | | |
| Ref. Ex. 1 | 514 | above 1000 | 2.2 | 0.4 | above 1000 | above 1 | — |
| Ex. 1 | 45 | 180 | less than 0.1 | 0 | 100 | 0.03 | 98.1 |
| Ex. 2 | 52 | 160 | less than 0.1 | 0 | 100 | 0.03 | 98.0 |
| Ex. 3 | 60 | 200 | less than 0.1 | 0 | 120 | 0.03 | 98.2 |
| Comparative Ex. 2 | 250 | 500 | 1.0 | 0.1 | 300 | 0.06 | 98.3 |
| Comparative Ex. 2 | 85 | 250 | less than 0.1 | 0 | 120 | 0.05 | 95.81 |

*Heat stability test conducted in the air at 150°C for 2 hours.

EXAMPLE 4

100 Grams of the crude DDA obtained in Reference Example 1 was added to 300 g of a 1% sodium sulfite aqueous solution and maintained for 60 minutes under boiling. After separating the crystals, the crystals were washed with 300 g of water and heat-treated in 300 g of water at 100°C for 60 minutes followed by separating the crystal at the same temperature. This crystal was air-dried at 80°C for 8 hours. The quality of the purified crystal is shown in Table 2.

Also, there is shown in Table 2 the quality of DOD obtained by adding 150 g of 2-ethylhexanol and 0.1 g of tetrabutyl titanate to 50 g of the purified DDA, conducting esterification reaction at 180° – 200°C for 4 – 5 hours and removing excess amount of 2-ethylhexanol.

EXAMPLE 5

Purification of DDA and synthesis of DOD were conducted under the same conditions using the same starting material as in Example 4 except for using potassium sulfite in place of sodium sulfite. The results obtained are shown in Table 2.

heat stability, coloration in alkali and nylon salt color. Evaluation of the purified DDA:

1. Heat stability;

20 g of DDA was placed in a test tube (20 mm$\phi$ × 230 mm), and the coloring degree after maintaining at 250°C for 0, 1 or 2 hours under nitrogenous atmosphere was compared with the [APHA] standard color.

2. Coloration in alkali;

1.0 g of DDA was dissolved in 25 ml of 1N-NaOH aqueous solution, and percent transmission was measured by means of a spectrophotometer (10 m/m cell; wavelength: 370 m$\mu$) using 1N-NaOH as a blank (100%) to calculate log ($I_o/I$). ($I_o$ = percent transmission of the blank, I = percent transmission of the sample)

3. Preparation and polymerization of 6,12-nylon salt;

20 g of DDA was heated to 70°C together with 20 g of water and neutralized with a 50 wt. % hexamethylenediamine aqueous solution, followed by adjusting the pH to 8 to prepare a 50% nylon salt aqueous solution. Then, 20 g of this nylon salt aqueous solution was Table 2

| | Nitrogen content (ppm) | Heat stability* (APHA) | DDA Content of dibasic acid having 11 carbon atoms (% by wt.) | Content of dibasic acid having 10 carbon atoms (% by wt.) | DOD Color* (APHA) | Acid value (mg KOH/g) |
|---|---|---|---|---|---|---|
| Ref. Ex. 1 | 514 | above 1000 | 2.2 | 0.4 | above 1000 | above 1 |
| Ex. 4 | 65 | 200 | less than 0.1 | 0 | 120 | 0.03 |
| Ex. 5 | 50 | 210 | less than 0.1 | 0 | 120 | 0.04 |

*Heat stability test conducted in the air at 150°C.

EXAMPLE 6

300 Gram-portion of crude DDA having nitrogen content of 210 ppm and Hazen color number (APHA) in a heat stability test of above 1000 (250°C, in nitrogen stream) and containing 2% of dicarboxylic acids having not more than 11 carbon atoms was added to each 1000 g of the purifying solution listed in Table 3 and kept for 3 hours in a boiling state. Thereafter, the crystal was separated while it was hot and rinsed with 1000 g of a 80°C hot water. Subsequently, 1000 g of pure water was added, and the mixture was heat-treated for 2 hours in a boiling state. The mixture was then filtered while hot to separate the crystal.

The thus obtained (purified) DDA crystal was dried with a hot air at 80°C for 12 hours.

Effects of purifying crude DDA with each treating solution are as shown in Table 3. According to the present invention, there were obtained DDA excellent in placed in a test tube (20 mm$\phi$ × 230 mm) and heated from a room temperature to 250°C in a salt bath under $N_2$ atmosphere followed by polymerization at 250°C for 5 hours under ordinary pressure.

Additionally, the nylon salt color was obtained by measuring the percent transmission of a 30 wt. % 6,12-nylon salt aqueous solution at 370 m$\mu$ and calculating log ($I_o/I$). ($I_o$ = percent transmission of water as a blank)

4. Evaluation of 6,12-nylon;

Coloring degree (in a molten state) of the polymer synthesized in the above item (3) was indicated in terms of (APHA) number.

$\eta$rel (relative viscosity) is a parameter showing the polymerization degree. 0.1 Gram of the above-described polymer was weighed out and dissolved in 25 ml of m-cresol (special grade), and the relative viscosity (to m-cresol) at 25°C was measured.

Table 3

| Purifying solution | Heat stability at 250°C under $N_2$ (APHA) | | | Coloration in alkali log($I_o/I$) | Nylon salt color log($I_o/I$) | 6,12-Nylon | | Acid sulfite or sulfite mole / DDA mole |
|---|---|---|---|---|---|---|---|---|
| | 0 hr | 1 hr | 2 hrs | | | Color (APHA) | $\eta$ref | |
| Hot water* | 40 | 200 | 400 | 0.187 | 0.83 | — | — | 0 |
| 1.46% $Na_2SO_3$ aq. soln.** | 20 | 70 | 90 | 0.015 | 0.04 | 40 | 1.63 | 0.09 |

Table 3—Continued

| Purifying solution | Heat stability at 250°C under N₂ (APHA) | | | Coloration in alkali log(I₀/I) | Nylon salt color log(I₀/I) | 6,12-Nylon | | Acid sulfite or sulfite mole |
| --- | --- | --- | --- | --- | --- | --- | --- | --- |
| | 0 hr | 1 hr | 2 hrs | | | Color (APHA) | ηref | DDA mole |
| 2.41% NaHSO₃ aq. soln.** | 20 | 60 | 80 | 0.010 | 0.03 | 30 | 1.62 | 0.18 |
| 0.93% NaOH aq. soln.* | 20 | 90 | 130 | 0.050 | 0.27 | 250 | 1.40 | 0.18 |
| 1.32% KOH aq. soln.* | 20 | 90 | 120 | 0.045 | 0.21 | 200 | 1.45 | 0.18 |
| 0.39% NH₃ aq. soln.* | 20 | 90 | 140 | 0.061 | 0.29 | — | — | 0.18 |
| 1.23% Na₂CO₃ aq. soln.* | 20 | 120 | 140 | 0.090 | 0.25 | 180 | 1.54 | 0.09 |
| 1.62% K₂CO₃ aq. soln.* | 20 | 90 | 130 | 0.050 | 0.23 | — | — | 0.09 |
| 1.11% (NH₄)₂CO₃ aq. soln.* | 30 | 100 | 170 | 0.088 | 0.40 | — | — | 0.09 |
| 2% NaOH aq. soln.* | 20 | 90 | 150 | 0.052 | 0.20 | — | — | 0.09 |
| 3% NaOH aq. soln.* | 20 | 180 | 220 | 0.045 | 0.19 | — | — | 0.57 |
| Na₂SO₃/NaHSO₃ (1.17%/0.48% aq. soln.** | 20 | 80 | 90 | 0.010 | 0.01 | — | — | 0.13 |
| 1.85% K₂SO₃ aq. soln.** | 20 | 70 | 80 | 0.012 | 0.04 | 50 | 1.60 | 0.09 |
| 1.34% (NH₄)₂SO₃ aq. soln.** | 20 | 80 | 90 | 0.013 | 0.04 | — | — | 0.09 |

*Comparative Example
**Example

While the invention has been described in detail and with reference to specific embodiments thereof, it will be apparent to one skilled in the art that various changes and modifications can be made therein without departing from the spirit and scope thereof.

What is claimed is:

1. A process for producing highly pure 1,12-dodecanedioic acid by purifying 1,12-dodecanedioic acid obtained by oxidizing cyclododecanol or cyclododecanone or mixtures thereof with nitric acid, which comprises heat-treating said 1,12-dodecanedioic acid with an aqueous solution containing acid sulfite ions or sulfite ions to decompose nitrogen-containing impurities, wherein said heat-treating is conducted a temperature of at least 80°C and for a period of at least 30 minutes.

2. A process according to claim 1, wherein said acid sulfite ions are derived by adding a material selected from the group consisting of sodium acid sulfite, potassium acid sulfite, lithium acid sulfite and ammonium acid sulfite.

3. A process according to claim 1, wherein said sulfite ions are derived by the addition of a member selected from the group consisting of sodium sulfite, potassium sulfite and ammonium sulfite.

4. A process according to claim 1 wherein an aqueous solution containing sodium sulfite is used.

5. A process according to claim 1 wherein an aqueous solution containing sodium acid sulfite is used.

6. A process according to claim 1 wherein 0.005 to 0.2 mole of acid sulfite ions or sulfite ions is used per 1 mole of 1,12-dodecanedioic acid to be purified.

7. A process according to claim 6, wherein the concentration of sulfite ion is 0.5 to 5% by weight.

8. A process according to claim 1, wherein said heat-treating is conducted at a temperature of above 90°C.

9. A process according to claim 8, wherein said heat-treating is conducted for a period of from 2 to 6 hours.

10. A process according to claim 1 wherein heat-treatment of 1,12-dodecanedioic acid with an aqueous solution containing acid sulfite ions or sulfite ion is followed by treatment with hot water at a temperature of not less than 80°C.

11. A process according to claim 10, wherein the time of the hot water treatment is about 120 minutes.

12. A process according to claim 8, wherein the amount of water used for said hot water treatment is about 1 to 20 times the amount of the 1,12-dodecanedioic acid.

13. A process according to claim 12, wherein the amount of water used for the hot water treatment is about 2 to 10 times the amount of the 1,12-dodecanedioic acid.

* * * * *